Patented Nov. 7, 1950

2,528,517

UNITED STATES PATENT OFFICE 2,528,517

IMPREGNATED PROTECTIVE CHARCOAL
AND ITS MANUFACTURE

Saul Hormats, Baltimore, Md.

No Drawing. Application June 26, 1942,
Serial No. 448,701

5 Claims. (Cl. 252—431)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates, generally, to improvements in methods of impregnating activated charcoals so as to obtain products having superior characteristics in respect to capacities to remove poisonous contaminants from air, and particularly in respect to increased hydrocyanic acid and cyanogen chloride activities.

During the first World War, when chemical warfare agents were first used on a large scale, a great deal of research and development work was done in connection with providing improved activated charcoals for use in gas mask canisters and other protective equipment. Toward the latter part of the war it was found that the capacity of activated charcoals to remove certain poisonous contaminants from air could be very greatly increased by impregnating the activated charcoals with certain metal oxides or hydroxides, particularly those of copper. These impregnated charcoals became generally known in the art as "whetlerites."

From the time of the original development, to date, the generally adopted method of preparing whetlerites has been to first treat an activated charcoal with a hot aqueous solution of a copper salt, such as copper sulphate or copper chloride, and then, after draining the charcoal, to apply a hot caustic solution to the charcoal so as to convert the copper salt to copper oxide and/or hydroxide. After washing the charcoal to remove soluble salts, the same is dried to yield the active product. In connection with this method of preparation, heretofore, it has always been considered essential to employ the hot caustic and copper salt solutions in order to obtain satisfactory impregnated charcoals. And, in line with this misunderstanding, it has always been the belief that the use of cold solutions would result in greatly inferior or useless products.

However, according to the present invention, it has been found, contrary to all expectations, that the use of cold caustic and copper salt solutions not only does not result in obtaining inferior impregnated charcoals, but on the contrary, that products are obtained having greatly superior properties in certain important respects.

Accordingly, the object of this invention, generally stated, is to provide, while proceeding contrary to the teaching of the prior art, improved impregnated charcoals or whetlerites and methods of making the same. The improvements result particularly in production at reduced cost of impregnated charcoals having increased capacities to remove contaminants from air and particularly in having greatly increased hydrocyanic and cyanogen chloride activities.

A specific object of the invention is the provision of a method of impregnating activated charcoals with cold solutions whereby thiocyanate may be added directly with the cold impregnating solutions so that only one drying step is required. Heretofore, it has been the practice to use a separate step to incorporate the thiocyanate in order to avoid decomposition of the thiocyanate by the hot impregnating solutions.

Other objects of the invention will, in part, be obvious, and will in part appear hereinafter.

For a more complete understanding of the nature and scope of this invention reference may be had to the following detailed description thereof setting forth, by way of illustration, certain specific impregnated charcoals and techniques of preparing the same.

As indicated, the invention, in broad terms, involves the use of cold impregnating solutions in contrast with the hot solutions used heretofore. By the use of the term "cold" in the specification and claims it is intended to designate the temperature range included between freezing and ordinary room temperatures. One of the principal advantages resulting from the practice of the invention is the production of impregnated charcoals or whetlerites having hydrocyanic acid activities of about twenty to twenty-five times those of unimpregnated activated charcoals, in contrast with the increased hydrocyanic acid activities of the prior art of from only one and one-half to two times that of the unimpregnated charcoals. Furthermore the use of cold solutions according to the invention makes possible the direct addition of thiocyanate to the caustic solutions without the possibility of decomposing the thiocyanate as would occur if the thiocyanate were added to the hot caustic solutions of the prior art. The direct addition of the thiocyanate increases the cyanogen chloride activity of the charcoal to the value now possessed only by charcoals undergoing intermediate impregnation and drying steps. Thus a substantial reduction in production cost and material is effected.

The three following examples illustrate the procedures and results obtainable in practicing the invention:

1. 75 grams of a coconut base charcoal, having a chlorpicrin activity of 45 minutes, was impregnated in 100 ml. of a solution of 40% $CuSO_4.5H_2O$. The charcoal was soaked for 10 minutes, drained 10 minutes, then soaked in a cold 10% NaOH solution for 20 minutes. The alkaline charcoal was then washed with cold tap water for one hour, drained and soaked in 10% NaOH plus 1% NaCNS for several hours. The product was drained and dried at 65° C. for 16 hours and at 100° C. for two hours. The activities obtained were—

HCN—130 minutes
AsH₃—44 minutes
CNCl—66 minutes 2. 100 grams coconut base charcoal, having a chlorpicrin activity of 45 minutes, was soaked for 15 minutes in a 40% copper sulphate solution, drained for 10 minutes, treated with ice cold 10% NaOH solution for 10 minutes and then washed with cold tap water for ten minutes. The drained charcoal was then soaked in a solution of 5% NaOH and 1% NaCNS for one hour in an ice bath, sucked dry on a Buchner funnel and then dried for 16 hours at room temperature and two hours at 150–160° C. The resulting activities were—

HCN—99 minutes
AsH₃—76 minutes
CNCl—84 minutes

3. The experiment was conducted the same as Example 2, except that 3% NaOH and 0.5% NaCNS were used for the final impregnation, resulting in a product having the following activities:

HCN—107 minutes
AsH₃—76 minutes
CNCl—79 minutes

It will be understood that the procedures of the foregoing examples may be varied within limits.

In adition to the specific advantages and novel features of the invention previously mentioned, the following additional advantages and novel features will be seen to be of importance in view of the specific procedures outlined in the above illustrative examples. As one of these additional advantages and novel features, there may be mentioned the use of cold wash water to remove soluble salts from the impregnated charcoal, thus preventing the deleterious effects of heat on the activity of the deposited copper. As another advantage and novel feature, the practice of using a second, cold, dilute caustic solution may be noted. It has been found that this further addition of cold, dilute caustic solution to the washed, wet charcoal serves to maintain and perhaps even increase the activity of charcoal during the subsequent drying operation. The advantages and novel feature of the addition of a soluble thiocyanate salt to the final caustic solution, thus achieving directly the benefit of the high cyanogen chloride activity of the thiocyanate without necessitating the intermediate drying and reimpregnation required by present practices, have been indicated above.

Since certain changes and modifications may be made in the foregoing procedures and methods of practicing the invention without departing from the scope thereof, it is intended that all matter described above be interpreted as illustrative and not in a limiting sense.

What is claimed as new is:

1. A process of treating activated charcoal to provide a material having increased capacity to remove poisonous contaminants from air and with a particularly high cyanogen chloride activity, which comprises the steps of, impregnating the activated charcoal with an equeous solution of a soluble copper salt, draining away the excess of the solution, treating the wet charcoal with cold dilute caustic solution so as to convert the copper salt to at least one of the groups consisting of oxide and hydroxide, washing the charcoal with cold water to remove soluble salts, soaking the charcoal in a cold solution of a soluble thiocyanate and dilute caustic, draining the wet charcoal, and drying the charcoal.

2. A process of treating activated charcoal to provide a material having increased capacity to remove poisonous contaminants from air and with a particularly high cyanogen chloride activity, which comprises the steps of, soaking the activated charcoal for about ten minutes in an aqueous solution containing about 40% by weight of $CuSO_4.5H_2O$, draining the charcoal for about ten minutes, soaking the charcoal for about twenty minutes in a cold solution containing about 10% by weight of NaOH, washing the charcoal with cold water for about one hour, draining the charcoal, soaking the charcoal in a solution containing about 10% by weight of NaOH and about 1% of NaCNS for several hours, draining the charcoal, and drying the charcoal at 65° C. for about sixteen hours and at 100° C. for about two hours.

3. A process of treating activated charcoal to provide a material having increased capacity to remove poisonous contaminants from air and with a particularly high cyanogen chloride activity, which comprises the steps of, soaking the activated charcoal for about fifteen minutes in an aqueous solution containing about 40% by weight of $CuSO_4.5H_2O$, draining the charcoal for about ten minutes, soaking the charcoal for about ten minutes in an ice cold solution containing about 10% by weight of NaOH, washing the charcoal with cold water for about ten minutes, draining the charcoal, soaking the charcoal for about an hour in a solution at ice bath temperature containing about 5% by weight of NaOH and about 1% by weight of NaCNS, sucking the charcoal dry, and drying the charcoal at room temperature for about sixteen hours and at 150–160° C. for about two hours.

4. A process of treating activated charcoal to provide a material having increased capacity to remove poisonous contaminants from air and with a particularly high cyanogen chloride activity, which comprises the steps of, soaking the activated charcoal for about fifteen minutes in an aqueous solution containing about 40% by weight of $CuSO_4.5H_2O$, draining the charcoal for about ten minutes, soaking the charcoal for about ten minutes in an ice cold solution containing about 10% by weight of NaOH, washing the charcoal with cold water for about ten minutes, draining the charcoal, soaking the charcoal for about an hour in a solution at ice bath temperature containing about 3% by weight of NaOH and about 0.5% by weight of NaCNS, sucking the charcoal dry, and drying the charcoal at room temperature for about sixteen hours and at 150–160° C. for about two hours.

5. The product made in accordance with the process of claim 4.

SAUL HORMATS.

REFERENCES CITED

The following references are of record in the file of this patent:

UNITED STATES PATENTS

| Number | Name | Date |
|---|---|---|
| 1,519,470 | Wilson | Dec. 16, 1924 |
| 1,540,447 | Wilson | June 2, 1925 |

OTHER REFERENCES

Mellor, Inorganic and Theoretical Chemistry, vol. III, 1923, page 142.